US010822439B2

(12) United States Patent
Elliott et al.

(10) Patent No.: US 10,822,439 B2
(45) Date of Patent: Nov. 3, 2020

(54) BUTYL RUBBER CONTAINING ALLYLIC ALCOHOL

(71) Applicant: ARLANXEO Singapore Pte. Ltd., Singapore (SG)

(72) Inventors: Sarah Elliott, Bright (CA); Gregory J. E. Davidson, London (CA); Sharon Guo, London (CA)

(73) Assignee: ARLANXEO SINGAPORE PTE. LTD., Singapore (SG)

( * ) Notice: Subject to any disclaimer, the term of this patent is extended or adjusted under 35 U.S.C. 154(b) by 206 days.

(21) Appl. No.: 16/063,327

(22) PCT Filed: Dec. 14, 2016

(86) PCT No.: PCT/CA2016/051478
§ 371 (c)(1),
(2) Date: Jun. 18, 2018

(87) PCT Pub. No.: WO2017/100923
PCT Pub. Date: Jun. 22, 2017

(65) Prior Publication Data
US 2018/0362683 A1 Dec. 20, 2018

(30) Foreign Application Priority Data
Dec. 17, 2015 (EP) .................................. 15200728

(51) Int. Cl.
*C08F 210/12* (2006.01)
*C08F 8/08* (2006.01)
*C08J 3/20* (2006.01)
*C08K 3/34* (2006.01)
*C08K 5/095* (2006.01)
*C08K 5/14* (2006.01)
*C08F 8/12* (2006.01)

(52) U.S. Cl.
CPC ............. *C08F 210/12* (2013.01); *C08F 8/08* (2013.01); *C08F 8/12* (2013.01); *C08J 3/203* (2013.01); *C08K 3/34* (2013.01); *C08K 5/095* (2013.01); *C08K 5/14* (2013.01); *C08F 2810/30* (2013.01); *C08F 2810/50* (2013.01); *C08J 2323/22* (2013.01)

(58) Field of Classification Search
CPC .... C08F 8/08; C08F 2810/30; C08F 2810/50; C08F 210/12; C08C 19/00; C08C 19/06; C08C 19/30; C08C 19/34; C08C 19/40; C08K 5/095; C08K 3/34; C08K 5/14; C08J 3/203; C08J 2323/22
See application file for complete search history.

(56) References Cited

U.S. PATENT DOCUMENTS

| 2,356,128 A | 8/1944 | Thomas et al. |
| 2,701,895 A | 2/1955 | Tawny et al. |
| 3,093,613 A | 6/1963 | Fusco et al. |
| 3,165,496 A | 1/1965 | Fusco et al. |
| 3,551,518 A | 12/1970 | Porinn et al. |
| 5,242,989 A | 9/1993 | Bening et al. |
| H001597 H | 9/1996 | Erickson |
| 5,886,106 A | 3/1999 | Sumner et al. |
| 2007/0276062 A1 | 11/2007 | Tirelli et al. |
| 2010/0292411 A1 | 11/2010 | Nakajima et al. |
| 2013/0345367 A1* | 12/2013 | Stojcevic ............. C08G 81/025 525/332.8 |
| 2014/0357794 A1 | 12/2014 | Mazumdar et al. |
| 2015/0315299 A1* | 11/2015 | Nguyen .................. C08C 19/06 524/291 |
| 2016/0121654 A1* | 5/2016 | Shibata ................... B32B 25/08 152/510 |
| 2019/0002597 A1 | 1/2019 | Binder et al. |
| 2019/0077889 A1 | 3/2019 | Nguyen |

FOREIGN PATENT DOCUMENTS

| CA | 2414932 A1 | 6/2003 |
| CA | 2557225 A1 | 2/2007 |
| CA | 2807735 A1 | 2/2012 |
| CA | 2894418 A1 | 6/2014 |
| CN | 1263902 A1 | 8/2000 |
| FR | 1383947 A | 1/1965 |
| GB | 774765 A | 5/1957 |
| WO | 94/00499 A1 | 1/1994 |

OTHER PUBLICATIONS

Puskas, J.E. et al. Rubber Chemistry and Technology vol. 67(2) pp. 329-341 (Year: 1994).*
Ullmann'S Encyclopedia of Industrial Chemistry, Rubber, 3. Synthetic, vol. A23, 1993, VCH Verlag, pp. 288-295.
Maurice Morton, Rubber Technology, $3^{rd}$ Edition; Van Nostrand Reinhold Company, (1987) pp. 297-300.
Aubert Y, Coran, Encyclopedia of Polymer Science and Engineering, vol. 17, Transitions and Relaxations to Zwitterionic Polymerization, Vulcanization, 1990, John Wiley & Sons, vol. 17, pp. 666-698.
International Search Report and Written Opinion, PCT Application No. PCT/CA2016/051478 dated Mar. 6, 2017.
International Preliminary Report on Patentability, PCT Application No. PCT/CA2016/051478 dated Jun. 19, 2018.

(Continued)

*Primary Examiner* — Irina S Zemel
*Assistant Examiner* — Jeffrey S Lenihan
(74) *Attorney, Agent, or Firm* — The Dobrusin Law Firm, P.C.

(57) ABSTRACT

A process for producing an allylic alcohol functionalized butyl rubber involves contacting an epoxidized butyl rubber with benzoic acid, an analogue of benzoic acid or a C1-C7 alkanoic acid. The process and a polymer compound comprising the epoxidized butyl rubber and the benzoic acid, analogue of benzoic acid or a C1-C7 alkanoic acid provide a cost effective route to a polar functionalized butyl rubber, particularly to butyl rubber comprising allylic alcohol functional groups.

20 Claims, 2 Drawing Sheets

(56) References Cited

OTHER PUBLICATIONS

International Search Report and Written from International Application No. PCT/CA2016/051477, dated Feb. 22, 2017.
International Preliminary Report on Patentability International Application No. PCT/CA2016/051477, dated Jun. 19, 2018.
International Search Report and Written from International Application No. PCT/CA2016/051479, dated Mar. 7, 2017.
International Preliminary Report on Patentability from International Application No. PCT/CA2016/051479, dated Jun. 19, 2018.
European Search Report, EP Patent Application No. 15200726 dated Jul. 13, 2016.
European Search Report, EP Patent Application No. 15200728 dated Jul. 22, 2016.
European Search Report, EP Patent Application No. 15200717 dated Jul. 21, 2016.
Commonly owned U.S. Appl. No. 16/063,334, filed Nov. 20, 2018, and published as US 2019/0077889 on Mar. 14, 2019.
Commonly owned U.S. Appl. No. 16/063,310, filed Jun. 18, 2018, and published as US 2019/0002597 on Jan. 3, 2019.

\* cited by examiner

BUTYL RUBBER CONTAINING ALLYLIC ALCOHOL

FIELD

This application relates to polymers, in particular to compositions comprising butyl rubber containing allylic alcohol functionality, and to processes and compositions for producing butyl rubbers containing allylic alcohol functionality.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-5 mole %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or copolymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295, the entire contents of which are herein incorporated by reference.

Polar functionalization of butyl rubber to impart better polymer/filler interactions and/or adhesion to surfaces has long been a focus to improve overall product performance. Many of the approaches start from bromobutyl rubber followed by an SN2 reaction of a polar nucleophile. This dependence on the reactivity bromobutyl rubber means higher cost of new material and reduced or sterically encumbered unsaturation available for curing.

A more cost-effective process for introducing polar functionalization into butyl rubber is still desired.

SUMMARY

There is provided a process for producing an allylic alcohol functionalized butyl rubber, comprising contacting an epoxidized butyl rubber with benzoic acid, an analogue of benzoic acid or a $C_1$-$C_7$ alkanoic acid.

There is also provided a polymer compound comprising an epoxidized butyl rubber and benzoic acid, an analogue of benzoic acid or a $C_1$-$C_7$ alkanoic acid.

The process and polymer compounds provide a cost effective route to a polar functionalized butyl rubber, particularly to butyl rubbers comprising allylic alcohol functional groups.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
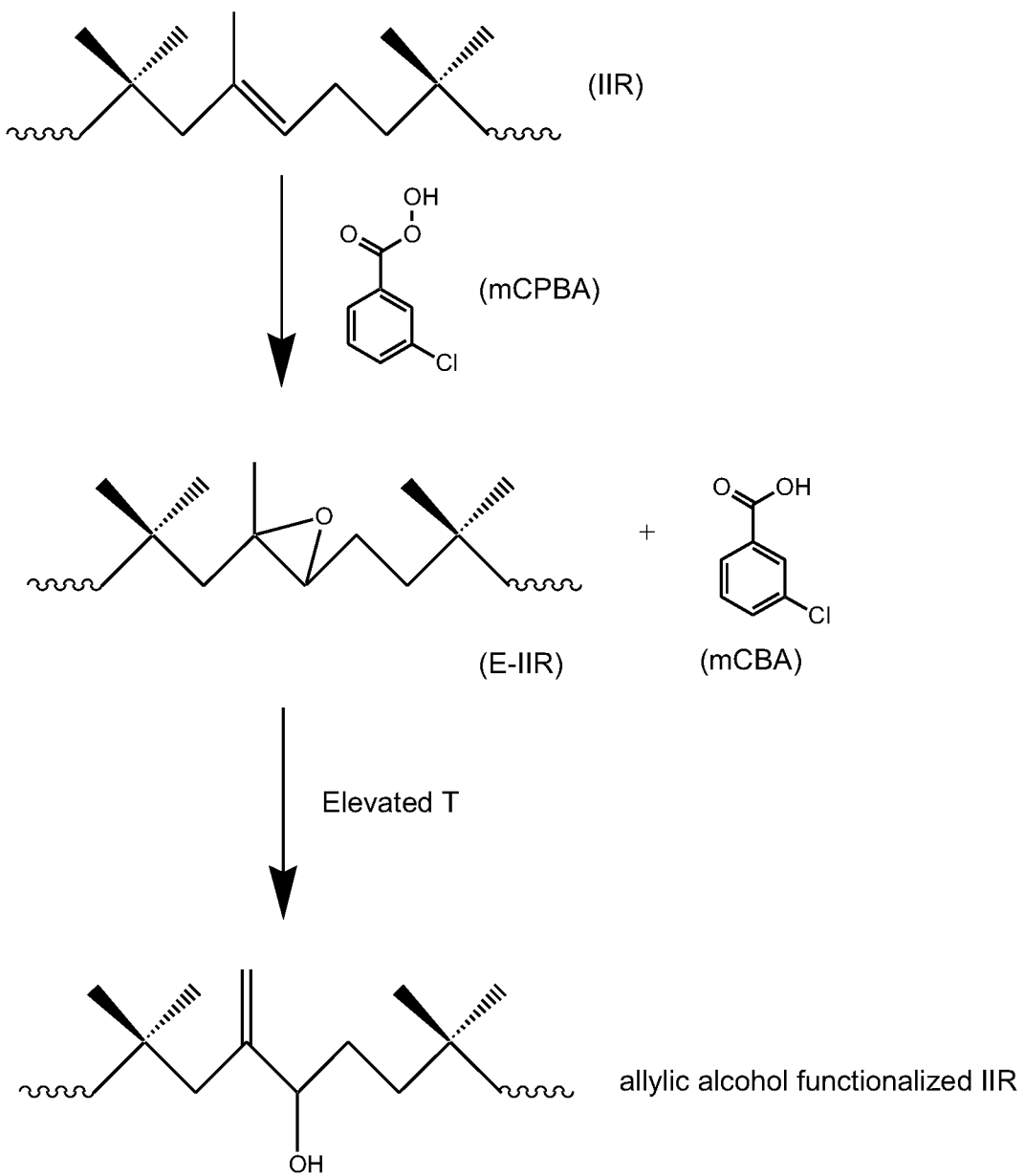
FIG. 1 depicts a scheme for producing allylic alcohol functionalized butyl rubber (IIR).

In accordance with the present invention, a process for producing an allylic alcohol functionalized butyl rubber comprises contacting an epoxidized butyl rubber with benzoic acid, an analogue of benzoic acid or a $C_1$-$C_7$ alkanoic acid. The epoxidized butyl rubber may be contacted with the acid by mixing the two together to form a polymer compound, for example in a mixer, and allowing the acid to catalyze ring-opening of epoxide functional groups to produce allylic alcohol functional groups on the butyl rubber. Suitable mixers include, for example, paddle mixers, sonic agitators, mills (e.g. ball mills, roll mills), Banbury™ mixers, Brabender™ mixers, extruders (e.g. single screw, twin screw), rotary mixers and the like.

In one embodiment, the epoxidized butyl rubber may be utilized in situ in a compound produced during the production of the epoxidized butyl rubber. When the epoxidized butyl rubber is utilized in situ, the acid may be added to and mixed in the epoxidized butyl rubber to disperse the acid therein to form a polymer compound comprising the epoxidized butyl rubber and the acid. However, in a preferred embodiment, the acid may be produced as a side product in the production of the epoxidized butyl rubber to directly form a polymer compound comprising the epoxidized butyl rubber and the benzoic acid, analogue of benzoic acid or $C_1$-$C_7$ alkanoic acid. Producing the acid in the same process as producing the epoxidized butyl rubber removes the need to utilize any other acid (e.g. p-toluenesulfonic acid (PTSA), HCl) to convert epoxide groups to allylic alcohol groups.

The epoxidized butyl rubber may be contacted with the acid in a solvent or in an absence of a solvent. In a preferred embodiment, the epoxidized butyl rubber may be contacted with the acid in an absence of a solvent. The epoxidized butyl rubber may be in a solid state, but typically has sufficient processibility in a mixer to permit mixing with the acid. Producing the acid and the epoxidized butyl rubber at the same time in a solid state process removes the need to utilize a solvent and to utilize further mixing to effect dispersion of the benzoic acid, analogue of benzoic acid or $C_1$-$C_7$ alkanoic acid (or any other acid) in the polymer compound.

Conversion of epoxide functional groups on the epoxidized butyl rubber to allylic alcohol functional groups in the presence of the acid may be accomplished at elevated temperature, preferably while continuing to mix the polymer compound, preferably in the same mixer in which the polymer compound was produced. The temperature is preferably about 95° C. or greater. The temperature is preferably about 200° C. or lower. The temperature is more preferably in a range of about 95-200° C., yet more preferably about 100-180° C., even yet more preferably about yet more preferably about 140-180° C. Conversion is preferably continued for an amount of time of about 10 minutes or greater, more preferably 20 minutes or greater. The conversion may be continued for any amount of time in accordance with desired outcomes. Conversion is preferably continued for about 48 hours or less, more preferably about 6 hours or less, even more preferably about 4 hours or less. Conversion is preferably accomplished for an amount of time in a range of about 20 minutes to about 4 hours, more preferably about 0.5 hour to about 2 hours.

The benzoic acid, analogue of benzoic acid or $C_1$-$C_7$ alkanoic acid in the compound is preferably present in a catalytic amount. A catalytic amount is preferably in a range of about 0.01-10 phr (part per hundred of rubber), more preferably in a range of about 0.1-8 phr, for example about 0.1-3.4 phr.

Conversion of the epoxide functional groups to allylic alcohol functional groups may be accelerated by including one or more other acidic compounds in the polymer compound. The one or more other acidic compounds may be added to and mixed with the polymer compound, or may be present during the production of the epoxidized butyl rubber. With other acidic compounds that are stronger acids, temperature may need to be controlled to avoid crosslinking. The one or more other acidic compounds is preferably one or more metal silicates. Metal silicates include, for example, aluminosilicates, magnesium silicates and the like. One example of a preferred aluminosilicate is Glomax™ LL, which is a dehydroxylated aluminum silicate produced by a controlled, high temperature heating of a water-fractionated kaolin. One example of a preferred magnesium silicate is talc, which is a mineral composed of hydrated magnesium silicate with the chemical formula $H_2Mg_3(SiO_3)_4$ or $Mg_3Si_4O_{10}(OH)_2$.

Benzoic Acid, Analogue of Benzoic Acid or $C_1$-$C_7$ Alkanoic Acid:

Benzoic acid and analogues of benzoic acid are known compounds. In a preferred embodiment, the benzoic acid or analogue of benzoic acid is a compound of formula (I):

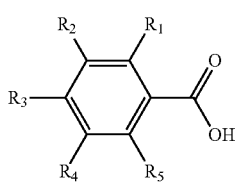

(I)

where $R_1$, $R_2$, $R_3$, $R_4$ and $R_5$ are independently hydrogen, methyl, ethyl, phenyl, chloro or bromo. Preferably, one of $R_1$, $R_2$, $R_3$, $R_4$ and $R_5$ is chloro. Preferably four of $R_1$, $R_2$, $R_3$, $R_4$ and $R_5$ are hydrogen. The benzoic acid or analogue of benzoic acid preferably comprises meta-chlorobenzoic acid (mCBA).

$C_1$-$C_7$ alkanoic acids are also known compounds. In a preferred embodiment, the $C_1$-$C_7$ alkanoic acid is a compound of formula (II):

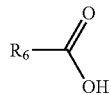

(II)

where $R_6$ is hydrogen, methyl, ethyl, propyl, butyl, pentyl or hexyl. The $C_1$-$C_7$ alkanoic acid preferably comprises acetic acid.

Benzoic acid, analogues of benzoic acid and $C_1$-$C_7$ alkanoic acids are readily available commercially or can be synthesized by any one of a number of well-known methods in the art. In a particularly preferred embodiment, the acid may be produced as a side product in the same reaction that produces the epoxidized butyl rubber, so that the presence of the acid already well-dispersed in the epoxidized butyl rubber compounds removes the need to further add and mix the acid to the epoxidized butyl rubber to produce the allylic alcohol functionalized butyl rubber. The acid may be a solid or liquid. Preferably, the acid is used in a solid state.

Epoxidized Butyl Rubber:

The epoxidized butyl rubber may be produced by at least partial epoxidation of a butyl rubber by any suitable method. A variety of methods for epoxidizing butyl rubber are known in the art. For example, it is known that the butyl rubber may be treated with a hydrogen peroxide precursor, often with the aid of a catalyst, to epoxidize ethylenic bonds in the butyl rubber. Catalysts may include, for example, transition metal complexes such as Ziegler/Natta-type catalysts (e.g. neodymium-based), molybdenum complexes (e.g. molybdenum naphthenate), vanadium complexes (e.g. acetylacetone vanadium complex) titanium complexes, tungsten compounds (e.g. tungsten oxide) and mixtures thereof.

The treatment may be performed in a solvent or in an absence of a solvent. Whether the treatment is in a solvent or in an absence of solvent, a suitable mixer may be utilized during the treatment to disperse the hydrogen peroxide precursor in the butyl rubber. Producing the epoxidized butyl rubber in a solid state reaction in an absence of a solvent is preferred. Suitable mixers include, for example, paddle mixers, sonic agitators, mills (e.g. ball mills, roll mills), Banbury™ mixers, Brabender™ mixers, extruders (e.g. single screw, twin screw), rotary mixers and the like. Once produced, the epoxidized butyl rubber may be first isolated, and possibly purified, before contacting with the benzoic acid, analogue of benzoic acid or $C_1$-$C_7$ alkanoic acid, or may be contacted in situ with the acid to form the allylic alcohol functionalized butyl rubber.

Hydrogen peroxide precursors suitable for epoxidizing the butyl rubber include, but are not limited to, hydrogen peroxide, inorganic peroxides, organic peroxides and mixtures thereof. Organic peroxides or mixtures thereof are preferred. Some organic peroxides include, for example, alkyl peroxides, alkyl hydroperoxides (e.g. tert-butyl hydroperoxide, ethyl hydroperoxide), peroxy acids and mixtures thereof. Peroxy acids or mixtures thereof are preferred. Some peroxy acids include, for example, peroxybenzoic acid, analogues of peroxybenzoic acid, peroxyalkanoic acids, trifluoroperoxyacetic acid, magnesium mono-peroxyphthalate or mixtures thereof. Organic peroxy acids which are compounds of formula (III) or (IV) are preferred:

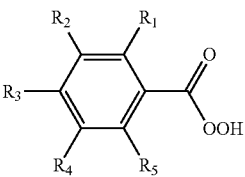

(III)

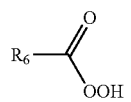

(IV)

where $R_1$, $R_2$, $R_3$, $R_4$ and $R_5$ are independently hydrogen, methyl, ethyl, phenyl, chloro or bromo, and $R_6$ is hydrogen, methyl, ethyl, propyl, butyl, pentyl or hexyl. Preferably, one of $R_1$, $R_2$, $R_3$, $R_4$ and $R_5$ is chloro. Preferably four of $R_1$, $R_2$, $R_3$, $R_4$ and $R_5$ are hydrogen. The peroxy acid preferably comprises meta-chloroperoxybenzoic acid (mCPBA) or peracetic acid.

Of particular note are peroxy acids of formula (III) or (IV) because the use of such peroxy acids to epoxidize the butyl rubber results in the production of acids of formula (I) or (II) as a side product, and the presence of acids of formula (I) or (II) already well-dispersed in the epoxidized butyl rubber compounds removes the need to add and mix the acid to produce the allylic alcohol functionalized butyl rubber. Peroxy acids of formula (III) are especially preferred.

In using a peroxy acid to epoxidize the butyl rubber, the butyl rubber is preferably mixed with the peroxy acid at a temperature at or above ambient temperature. Ambient temperature is the temperature at which the butyl rubber is being mixed with the peroxy acid in an absence of externally applied heating. The mixing process itself provides heat, which aids in the mixing process by softening the polymer. To reduce the chance of polymer degradation, it is preferable to mix the butyl rubber with the peroxy acid at a temperature of no more than about 95° C., more preferably no more than about 75° C., more preferably no more than about 65° C. and more preferably no more than about 50° C. While the act of mixing may raise the ambient temperature to about 30° C. or even higher, in some embodiments it may be desirable to apply more heat to raise the temperature even higher. In some embodiments, the butyl rubber may be mixed with the peroxy acid at a temperature in a range of ambient temperature to about 95° C., in a range of ambient temperature to about 75° C., or in a range of ambient temperature to about 50° C. In some embodiments, unsaturated polymer may be mixed with the peroxy acid at a temperature in a range of about 20° C. to about 95° C., or in a range of about 30° C. to about 50° C. In one preferred embodiment, the temperature at which the butyl rubber is mixed with the peroxy acid is ambient temperature in an absence of externally applied heating.

The butyl rubber is preferably mixed with the peroxy acid for a length of time less than about 4 hours, more preferably less than about 1 hour, yet more preferably less than about 0.5 hour. In one embodiment, the length of time may be about 10 minutes or less. In another embodiment, the length of time may be about 5 minutes or less. In some embodiment, the length of time may be 30 seconds or more, or 1 minute or more, or 2 minutes or more.

The peroxy acid is preferably mixed with the butyl rubber in an absence of solvent. The butyl rubber is in a solid state; however, the butyl rubber typically has sufficient processibility in a mixer to permit mixing with the peroxy acid. The peroxy acid may be a solid or a liquid. Peroxy acid in the solid state is preferred. Mixing of solid butyl rubber and peroxy acid may be accomplished using any suitable mixer in the art. Some examples of mixers for polymers and polymer additives include mills (e.g. roll mills, ball mills), blade mixers, internal mixers (e.g. Banbury™ and Brabender™ mixers), extruders (twin screw, single screw) and the like. Mills are particularly preferred. With a view to effective mixer capacity and the amount of butyl rubber and peroxy acid used, the time, temperature and shear while mixing may be controlled to optimize conversion efficiency.

The peroxy acid may be used in an amount considerably less than in other solid state epoxidation processes in the art. The peroxy acid is preferably used in an amount of about 5 mol % or less equivalents to unsaturation, even about 3 mol % or less equivalents to unsaturation, while having high conversion efficiency of the butyl rubber to the epoxidized polymer. In some embodiments, suitable amounts of the peroxy acid are in a range of 0.1-5 mol %, or 0.4-4 mol % or 0.7-3 mol % equivalents to unsaturation.

For enhanced control over fast kinetics of the epoxidation reaction, a master batch approach to mixing is preferred. In this approach, the peroxy acid may be supported on a support matrix, for example a matrix comprising a saturated polymer, and the supported peroxy acid mixed with butyl rubber. The saturated polymer preferably comprises a saturated elastomer. Some examples of saturated polymers include polyisobutylene (IB), epichlorohydrin rubber (ECO), polyacrylic rubber (ACM, ABR), silicone rubber (SI, Q, VMQ), fluorosilicone rubber (FVMQ), fluoroelastomers (FKM, and FEPM), perfluoroelastomers (FFKM), polyether block amides (PEBA), chlorosulfonated polyethylene (CSM), ethylene-vinyl acetate (EVA) or mixtures thereof. The saturated polymer preferably comprises a polyisobutylene. Low or medium molecular weight polyisobutylenes are preferred.

Using a peroxy acid as described above to epoxidize the butyl rubber may have one or more advantages including requiring no solvent, requiring no catalyst, requiring no or little applied external heat input, requiring no applied cooling, requiring less epoxidation agent, being faster, and/or resulting in more efficient conversion of the polymer.

The butyl rubber may comprise a copolymer comprising repeating units derived from at least one isoolefin monomer and repeating units derived from at least one multiolefin monomer.

The butyl rubber is not limited to a special isoolefin. However, isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene (isobutylene).

The butyl rubber is not limited to a special multiolefin. Every multiolefin copolymerizable with the isoolefin known by the skilled in the art can be used. However, multiolefins within the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, preferably conjugated dienes, are used. Isoprene is more preferably used. The butyl rubber useful in the present invention may include a co-monomer other than the above referenced multiolefins, such as an alkyl-substituted vinyl aromatic co-monomer, including but not limited to a $C_1$-$C_4$ alkyl substituted styrene, for example para-methylstyrene.

As optional monomers, any monomer copolymerizable with the isoolefins and/or dienes known by the skilled in the art can be used. α-methyl styrene, p-methyl styrene, chlorostyrene, cyclopentadiene and methylcyclopentadiene are preferably used. Indene and other styrene derivatives may also be used. The butyl rubber can include, for example, random copolymers of isobutylene, isoprene and para-methyl styrene.

In one embodiment, the isoolefin copolymer may be formed by copolymerization of a monomer mixture. Preferably, the monomer mixture comprises about 80-99.9 mol % of at least one isoolefin monomer and about 0.1-20 mol % of at least one multiolefin monomer, based on the monomers in the monomer mixture. More preferably, the monomer mixture comprises about 90-99.9 mol % of at least one isoolefin monomer and about 0.1-10 mol % of at least one multiolefin monomer. In one embodiment, the monomer mixture comprises about 92.5-97.5 mol % of at least one isoolefin monomer and about 2.5-7.5 mol % of at least one multiolefin monomer. In another embodiment, the monomer mixture comprises about 97.4-95 mol % of at least one isoolefin monomer and about 2.6-5 mol % of at least one multiolefin monomer.

If the monomer mixture comprises the optional monomer copolymerizable with the isoolefins and/or dienes, the optional monomer preferably replaces a portion of the multiolefin monomer. The monomer mixture may also comprise from 0.01% to 1% by weight of at least one multiolefin cross-linking agent, and when the multiolefin cross-linking agent is present, the amount of multiolefin monomer is reduced correspondingly.

The isoolefin copolymer may be formed by copolymerization of a monomer mixture, for example by solution polymerization. A solution polymerization reaction is performed in the presence of an initiator system (e.g. a Lewis acid catalyst and a proton source) capable of initiating the polymerization process. A proton source suitable in the present invention includes any compound that will produce a proton when added to the Lewis acid or a composition containing the Lewis acid. Protons may be generated from the reaction of the Lewis acid with proton sources to produce the proton and the corresponding by-product. Such reaction may be preferred in the event that the reaction of the proton source is faster with the protonated additive as compared with its reaction with the monomers. Proton generating reactants include, for example such as water, alcohols, phenol thiols, carboxylic acids, and the like or any mixture thereof. Water, alcohol, phenol or any mixture thereof is preferred. The most preferred proton source is water. A preferred ratio of Lewis acid to proton source is from 5:1 to 100:1 by weight, or from 5:1 to 50:1 by weight. The initiator system including the catalyst and proton source is preferably present in the reaction mixture in an amount of 0.02-0.1 wt %, based on total weight of the reaction mixture.

Alkyl aluminum halide catalysts are a particularly preferred class of Lewis acids for catalyzing solution polymerization reactions in accordance with the present invention. Examples of alkyl aluminum halide catalysts include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof. In a particularly preferred initiator system, the catalyst comprises ethyl aluminum sesquichloride, preferably generated by mixing equimolar amounts of diethyl aluminum chloride and ethyl aluminum dichloride, preferably in a diluent. The diluent is preferably the same one used to perform the copolymerization reaction.

One or more other catalysts useful in solution copolymerization of isoolefins may also be present in the initiator system, for example titanium tetrachloride, stannous tetrachloride, boron trifluoride, boron trichloride, or methylalumoxane. The monomers are generally polymerized cationically, preferably at temperatures in the range of from about −100° C. to about −50° C., preferably in the range of from about −95° C. to about −65° C. The temperature is preferably about −80° C. or greater.

The solution comprises 0-30 vol % of an aliphatic hydrocarbon diluent, based on volume of the solution. In preferred embodiments, the solution comprises 0.1-30 vol % or 0.1-20 vol % of the aliphatic hydrocarbon diluent. The aliphatic hydrocarbon may be in a common aliphatic medium comprising at least 80 wt % of one or more aliphatic hydrocarbons having a boiling point in the range of 45° C. to 80° C. at a pressure of 1013 hPa, preferably at least 90 wt %, and even more preferably at least 95 wt %. Aliphatic hydrocarbons having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

A C6 solvent is a particularly preferred choice for use in a solution process. A lower molecular weight solvent, such as C5 or lighter, has a boiling point close to the monomers and the monomers therefore may not be separable from the solution by distillation. A higher molecular weight solvent, such as C7 or heavier, would be more difficult to separate from the rubber after halogenation. The solution viscosity provided by use of a C7 solvent is also significantly higher than with a C6 solvent, making the solution more difficult to handle and impeding heat transfer in the reactor, even when provided with the high monomer to solvent ratios described above. As a result, the C6 solvents of the present invention are a preferred selection from among the available solvents. C6 solvents suitable for use in the present invention preferably have a boiling point of between 50° C. and 69° C. Examples of preferred C6 solvents include n-hexane or hexane isomers, such as 2-methyl pentane or 3-methyl pentane, or mixtures of n-hexane and such isomers as well as cyclohexane. The common aliphatic medium may, for example, further comprise other compounds which are inert under polymerization conditions such as other aliphatic hydrocarbons, for example heptanes and octanes having a boiling point of more than 80° C. at a pressure of 1013 hPa, propanes, butanes, n-pentane, cyclohexane as well as halohydrocarbons such as methylchloride, hydrofluorocarbon (HFC) and other halogenated aliphatic hydrocarbons which are inert under reaction conditions.

Copolymerization process may be performed as a batch process in a batch reactor or a continuous process (e.g. a plug flow process) in a continuous reactor. In a continuous process, the process is preferably performed with at least the following feed streams: solvent/diluent+isoolefin (preferably isobutene)+multiolefin (preferably diene, isoprene); initiator system; and, optionally, a multiolefin cross-linking agent.

It should be noted that the multiolefin crosslinking agent can also be added in the same feed stream as the isoolefin and multiolefin. While cross-linking agents are not necessary to increase molecular weight of the copolymer to a processable level, cross-linking agents may nevertheless be used if desired.

To form a halogenated butyl rubber, the butyl rubber may be subjected to a halogenation process. Bromination or chlorination can be performed according to a process known by those skilled in the art, for example, the procedures described in Rubber Technology, 3rd Ed., Edited by Maurice Morton, Kluwer Academic Publishers, pp. 297-300 and further documents cited therein. Preferably, halogenation is performed according to a process as described in U.S. Pat.

No. 5,886,106 issued Mar. 23, 1999, the contents of which is herein incorporated by reference. The amount of halogenating agent added is controlled to provide a final halogen content of 0.05-2.5 mol % in the halogenated copolymer. Halogenation agents useful for halogenating butyl rubber may comprise elemental chlorine ($Cl_2$) or bromine ($Br_2$) and/or organo-halide precursors thereto, for example dibromo-dimethyl hydantoin, tri-chloroisocyanuric acid (TClA), n-bromosuccinimide, or the like. Preferably, the halogenation agent comprises or is bromine. Preferably, halogenation comprises bromination.

During halogenation of butyl rubber containing conjugated dienes, such as isoprene, some or all of the multiolefin content of the isoolefin copolymer is converted to allylic halides. The total allylic halide content of the halogenated butyl rubber may not exceed the starting multiolefin content of the parent butyl rubber. The allylic halide sites allow for reacting with and attaching a nucleophile to the halogenated butyl rubber.

Curing:

The allylic alcohol functionalized butyl rubber produced by the process may further be cured by any suitable method, for example sulfur-based curatives, peroxide-based curatives, ZnO curatives, resin cure systems or UV light. A typical sulfur-based curing system comprises: (i) a metal oxide, (ii) elemental sulfur and (iii) at least one sulfur-based accelerator. The use of metal oxides as a component in the curing system is well known in the art. A suitable metal oxide is zinc oxide, which is typically used in the amount of from about 1 to about 10, preferably from about 2 to about 5, parts by weight per hundred parts by weight polymer in the composition. Elemental sulfur, comprising component (ii) of the preferred curing system is typically used in amounts of from about 0.2 to about 10 parts by weight per hundred parts by weight polymer in the composition. Suitable sulfur-based accelerators (component (iii) of the preferred curing system) are typically used in amounts of from about 0.5 to about 3 parts by weight, per hundred parts by weight polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide. In some embodiments of a resin cure system, the resin cure system may comprise a halogenated phenol formaldehyde resin or a phenol formaldehyde resin, optionally in conjunction with an activator. Halogenated phenol formaldehyde resins and phenol formaldehyde resins are known in the art as described in U.S. Pat. Nos. 2,701, 895, 3,093,613 and 3,165,496, which are herein incorporated by reference. An alkyl phenol-formaldehyde derivative, for example octylphenol-formaldehyde with methylol active group, is typical. Metal oxides, for example zinc oxide, and/or other curing or processing aids (e.g. stearic acid) may also be used in the resin cure system. Metal oxides may be used in the amount of from about 1 to about 10 parts by weight per hundred parts by weight polymer in the composition. Resin may be used in amounts of from about 0.2 to about 20 phr. Other curing or processing aids may be used in amounts of from about 0.2 to about 10 phr.

Additives:

The allylic alcohol functionalized butyl rubber may be compounded with various auxiliary products, shaped into an article, and the resulting compound cured. Auxiliary products for polymers (e.g. rubbers) include, for example, reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. Further information on vulcanization may be obtained in Encyclopedia of Polymer Science and Engineering, Vol. 17, s. 666 et seq. (Vulcanization).

In a particular embodiment, the allylic alcohol functionalized butyl rubber may be compounded with a suitable filler (e.g. mineral and/or non-mineral fillers) to enhance certain desirable physical properties, such as tensile strength, viscosity, hardness, permeability, etc. Suitable fillers are selected from those that do not impart undesirable residues or otherwise adversely affect the polymer for use in the aforementioned "clean" applications. Examples of suitable fillers include silica, silicates, high aspect ratio or nano-sized versions thereof, and other suitable clean fillers. The selection of filler for imparting desired physical properties while retaining clean characteristics is within the purview of persons skilled in the art. Conventional amounts of fillers are from about 1 to 150 phr (parts per hundred rubber).

Uses:

The allylic alcohol functionalized butyl rubber produced in accordance with the present process is useful in various products including inner liners, bladders, tubes, air cushions, pneumatic springs, air bellows, accumulator bags, hoses, conveyor belts and pharmaceutical closures, automobile suspension bumpers, auto exhaust hangers, body mounts, shoe soles, tire sidewalls and tread compounds, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, a container closure or lid; a seal or sealant, such as a gasket or caulking; a material handling apparatus, such as an auger or conveyor belt; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing, appliances, baby products, bathroom fixtures, bathroom safety, flooring, food storage, garden, kitchen fixtures, kitchen products, office products, pet products, sealants and grouts, spas, water filtration and storage, equipment, food preparation surfaces and equipment, shopping carts, surface applications, storage containers, footwear, protective wear, sporting gear, carts, dental equipment, door knobs, clothing, telephones, toys, catheterized fluids in hospitals, surfaces of vessels and pipes, coatings, food processing, biomedical devices, filters, additives, computers, ship hulls, shower walls, tubing, pacemakers, implants, wound dressing, medical textiles, ice machines, water coolers, fruit juice dispensers, soft drink machines, piping, storage vessels, metering systems, valves, fittings, attachments, filter housings, linings, and barrier coatings.

The allylic alcohol functionalized butyl rubber is particularly useful in bladders (e.g. curing bladders), tire inner liners, coating applications and sealants (e.g. window and bathroom caulking) because the cured polymer displays improved ageing properties. One particularly useful application of the allylic alcohol functionalized butyl rubber is in tire inner liners filled with high aspect ratio (HAR) talc.

EXAMPLES

FIG. 1 illustrates a preferred embodiment of the production of allylic alcohol functionalized butyl rubber. Butyl rubber (IIR) may be epoxidized in the solid state with meta-chloroperoxybenzoic acid (mCPBA) in the absence of a solvent at a temperature between ambient temperature and 95° C. to produce a polymer compound comprising epoxidized butyl rubber (E-IIR) and meta-chlorobenzoic acid (mCBA) well dispersed in the polymer compound. Elevating the temperature (T) above 95° C. then converts the epoxidized butyl rubber to allylic alcohol functionalized butyl rubber in the presence of the meta-chlorobenzoic acid.

Example 1

Epoxidized butyl rubber (epoxidized RB301) containing 1.36 mol % epoxy groups is mixed in the solid state with sufficient meta-chlorobenzoic acid (mCBA) at a temperature between ambient temperature and 95° C. to provide about 6 phr of residual mCBA in the resulting polymer compound.

After producing the polymer compound comprising the epoxidized butyl rubber and residual meta-chlorobenzoic acid (mCBA), the temperature may be raised and the compound further mixed in the same mixer to effect conversion of the epoxide functional groups to allylic alcohol functional groups. It should be noted that the exo isomer of the allylic alcohol functionalized IIR forms preferentially over the endo isomer.

Figure 2:
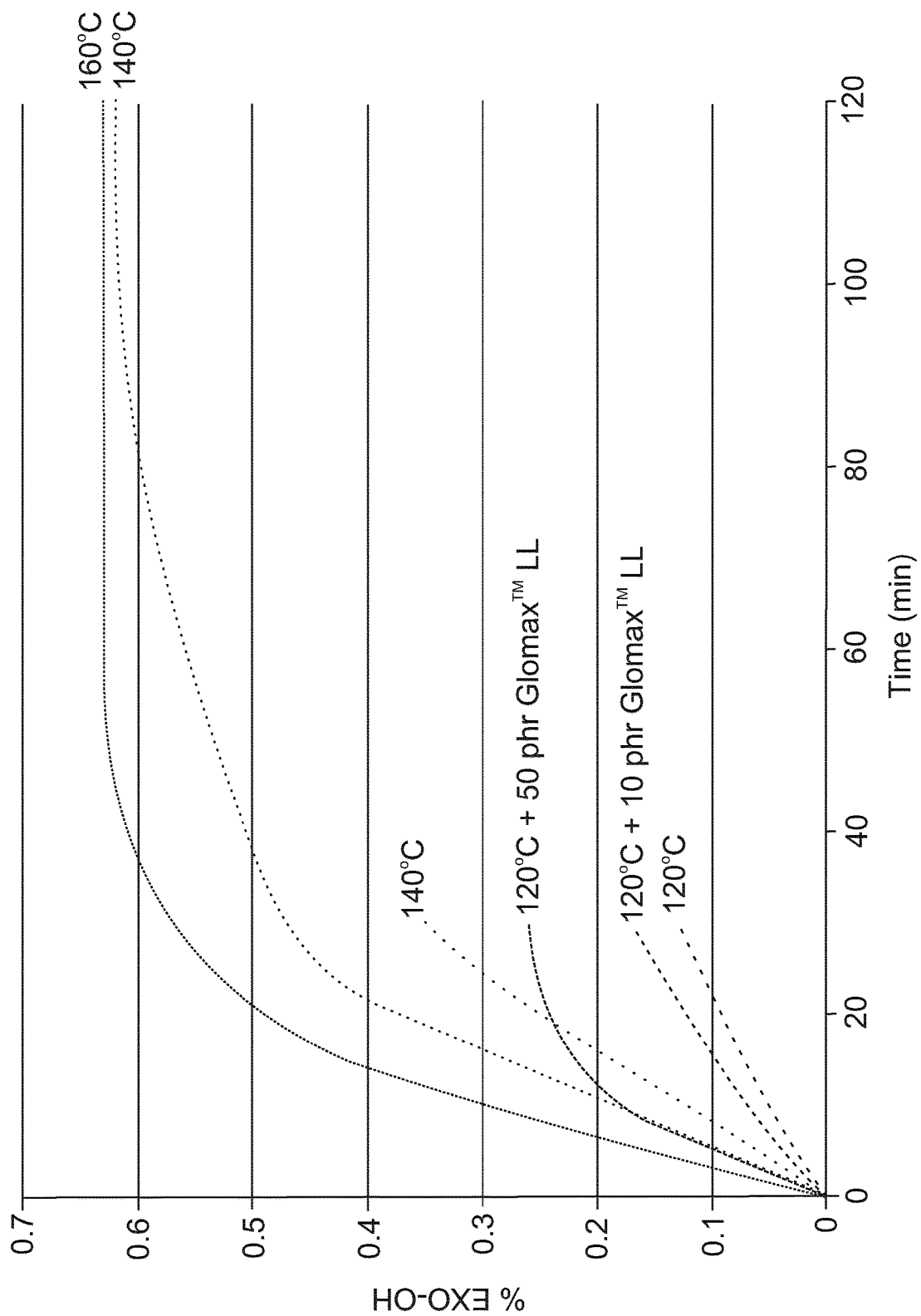
FIG. 2 is a graph showing extent of epoxide conversion to allylic alcohol (% EXO-OH) vs. time (min) for a polymer compound comprising an epoxidized butyl rubber and meta-chlorobenzoic acid at various temperatures and with the presence of an aluminosilicate in various amounts.

FIG. 2 illustrates extent of epoxide conversion to allylic alcohol (% EXO-OH) vs. time (min) at 120° C., 140° C. and 160° C. without added Glomax™ LL and with 10 phr or 50 phr Glomax™ LL. % EXO-OH was determined using $^1$H NMR analysis using a macro. FIG. 2 shows that increasing the temperature increases the rate of ring opening of the epoxide and conversion to allylic alcohol in the solid state. Further, the extent of conversion plateaus between 0.6% and 0.7%. FIG. 2 also shows that Glomax™ LL increases the rate of conversion and that more Glomax™ LL further increases conversion rate at least up to an amount of Glomax™ LL of 50 phr.

The novel features will become apparent to those of skill in the art upon examination of the description. It should be understood, however, that the scope of the claims should not be limited by the embodiments, but should be given the broadest interpretation consistent with the wording of the claims and the specification as a whole.

What is claimed is:

1. A process for producing an allylic alcohol functionalized butyl rubber, the process comprising contacting an epoxidized butyl rubber with benzoic acid, an analogue of benzoic acid or a $C_1$-$C_7$ alkanoic acid in an absence of a solvent, wherein the benzoic acid or analogue of benzoic acid is a compound of formula (I):

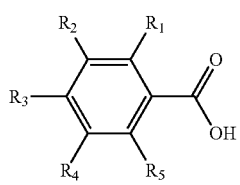

(I)

where $R_1$, $R_2$, $R_3$, $R_4$ and $R_5$ are independently hydrogen, methyl, ethyl, phenyl, chloro or bromo.

2. The process according to claim 1, wherein the epoxidized butyl rubber is contacted with the benzoic acid or analogue of benzoic acid wherein the benzoic acid.

3. The process according to claim 1, wherein the benzoic acid or analogue of benzoic acid comprises meta-chlorobenzoic acid.

4. The process according to claim 1, wherein the epoxidized butyl rubber is contacted with the $C_1$-$C_7$ alkanoic acid.

5. The process according to claim 4, wherein the $C_1$-$C_7$ alkanoic acid is a compound of formula (II):

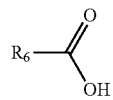

(II)

where $R_6$ is hydrogen, methyl, ethyl, propyl, butyl, pentyl or hexyl.

6. The process according to claim 1, wherein the allylic alcohol functionalized butyl rubber is produced from the epoxidized butyl rubber and the acid at a temperature of about 95° C. or greater.

7. The process according to claim 1, wherein the epoxidized butyl rubber is contacted with the acid for an amount of time of about 10 minutes or greater.

8. The process according to claim 1, wherein:
the benzoic acid or analogue of benzoic acid comprises meta-chlorobenzoic acid;
the $C_1$-$C_7$ alkanoic acid is a compound of formula (II):

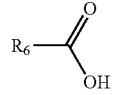

(II)

where $R_6$ is hydrogen, methyl, ethyl, propyl, butyl, pentyl or hexyl; and
the epoxidized butyl rubber comprises an isoolefin copolymer comprising repeating units derived from at least one isoolefin monomer and repeating units derived from at least one multiolefin monomer.

9. The process according to claim 8, wherein:
the isoolefin monomer comprises isobutene and/or wherein the at least one multiolefin monomer comprises isoprene;
the butyl rubber is a non-halogenated butyl rubber;
the contacting is done at a temperature of about 140° C. to about 180° C., and for a period of time of about 10 minutes or greater.

10. The process according to claim 8, wherein:
the isoolefin monomer comprises isobutene and/or wherein the at least one multiolefin monomer comprises isoprene;
the butyl rubber is a halogenated butyl rubber;
the contacting is done at a temperature of about 140° C. to about 180° C., and for a period of time of about 10 minutes or greater.

11. A process for producing an allylic alcohol functionalized butyl rubber, the process comprising:
epoxidizing a butyl rubber with peroxybenzoic acid, an analogue of peroxybenzoic acid or a $C_1$-$C_7$ peroxyalkanoic acid in an absence of a solvent to form a polymer compound comprising the epoxidized butyl rubber and the benzoic acid, analogue of benzoic acid or $C_1$-$C_7$ alkanoic acid, and producing allylic alcohol functionalized butyl rubber in situ from the epoxidized butyl rubber and the benzoic acid, analogue of benzoic acid or $C_1$-$C_7$ alkanoic acid, wherein the peroxybenzoic acid or analogue of peroxybenzoic acid is a compound of formula (III):

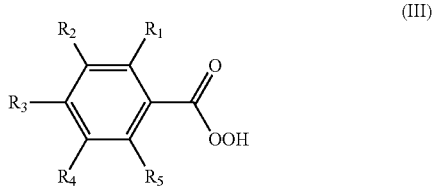

(III)

where $R_1$, $R_2$, $R_3$, $R_4$ and $R_5$ are independently hydrogen, methyl, ethyl, phenyl, chloro or bromo; and the benzoic acid or analogue of benzoic acid is a compound of formula (I):

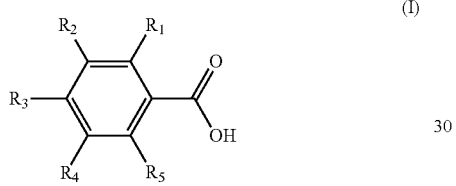

(I)

where $R_1$, $R_2$, $R_3$, $R_4$ and $R_5$ are independently hydrogen, methyl, ethyl, phenyl, chloro or bromo.

12. The process according to claim 11, wherein the butyl rubber is a non-halogenated butyl rubber.

13. The process according to claim 11, wherein the butyl rubber comprises an isoolefin copolymer comprising repeating units derived from at least one isoolefin monomer and repeating units derived from at least one multiolefin monomer.

14. The process according to claim 13, wherein the isoolefin monomer comprises isobutene and/or wherein the at least one multiolefin monomer comprises isoprene.

15. The process according to claim 11, wherein:
the butyl rubber is a non-halogenated; and
the butyl rubber comprises an isoolefin copolymer comprising repeating units derived from at least one isoolefin monomer and repeating units derived from at least one multiolefin monomer.

16. The process according to claim 15, wherein the isoolefin monomer comprises isobutene and/or wherein the at least one multiolefin monomer comprises isoprene.

17. The process according to claim 11, wherein:
the butyl rubber is a halogenated butyl rubber; and
optionally wherein the butyl rubber comprises an isoolefin copolymer comprising repeating units derived from at least one isoolefin monomer and repeating units derived from at least one multiolefin monomer.

18. A polymer compound comprising:
an epoxidized butyl rubber; and
an acid selected from benzoic acid or an analogue of benzoic acid, wherein the benzoic acid or analogue of benzoic acid is a compound of formula (I):

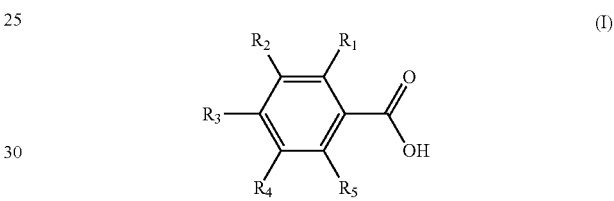

(I)

where $R_1$, $R_2$, $R_3$, $R_4$ and $R_5$ are independently hydrogen, methyl, ethyl, phenyl, chloro or bromo.

19. The polymer compound according to claim 18, wherein: the benzoic acid or analogue of benzoic acid comprises meta-chlorobenzoic acid.

20. The polymer compound according to any one of claim 18 produced by mixing the butyl rubber and the benzoic acid or the analogue of benzoic acid in an absence of solvent.

* * * * *